(12) United States Patent
Mashkevich et al.

(10) Patent No.: US 10,368,405 B2
(45) Date of Patent: Jul. 30, 2019

(54) TWO STAGE INDICATOR DIMMING CIRCUIT CONTROLLED BY PWM BACKLIGHTING BACK FEED AND BACKLIGHT CONTROL

(71) Applicants: Michael Mashkevich, West Bloomfield, MI (US); David A Lescamela, Macomb, MI (US); James M Burcar, Rochester, MI (US); Ron R Peteuil, Rochester Hills, MI (US)

(72) Inventors: Michael Mashkevich, West Bloomfield, MI (US); David A Lescamela, Macomb, MI (US); James M Burcar, Rochester, MI (US); Ron R Peteuil, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 788 days.

(21) Appl. No.: 14/570,660

(22) Filed: Dec. 15, 2014

(65) Prior Publication Data

US 2016/0167575 A1    Jun. 16, 2016

(51) Int. Cl.
*H05B 33/08* (2006.01)
*B60Q 3/18* (2017.01)

(52) U.S. Cl.
CPC .......... *H05B 33/0815* (2013.01); *B60Q 3/18* (2017.02); *H05B 33/0845* (2013.01)

(58) Field of Classification Search
CPC .. B60Q 11/005; B60Q 1/1415; B60Q 1/1461; B60Q 3/16; B60Q 3/18; H05B 37/02; H05B 33/0815; H05B 39/09; H05B 33/0845

USPC ............ 315/136, 129, 93, 132, 77; 362/641
See application file for complete search history.

(56) References Cited

U.S. PATENT DOCUMENTS

| | | | | |
|---|---|---|---|---|
| 4,090,189 A | * | 5/1978 | Fisler | H05B 33/0818 315/169.1 |
| 4,358,713 A | * | 11/1982 | Senoo | H05B 39/047 315/169.1 |
| 9,832,829 B2 | * | 11/2017 | Ohira | H05B 33/0848 |

(Continued)

FOREIGN PATENT DOCUMENTS

JP    H07242146 A    9/1995

OTHER PUBLICATIONS

International Search Report and Written Opinion dated Jul. 11, 2016 for International Application No. PCT/US2015/065440, International Filing Date Dec. 14, 2015.

*Primary Examiner* — Tung X Le
(74) *Attorney, Agent, or Firm* — Ralph E. Smith

(57) ABSTRACT

A dimming circuit for an indicator switch has a control input, a dimming state and a non-dimming state. The dimming circuit is responsive to the presence of a backlight PWM signal at the control input of the dimming circuit to switch to the dimming state and responsive to the absence of the backlight PWM signal at the control input of the dimming circuit to switch to the non-dimming state. In the dimming state a high resistance of the dimming circuit is coupled in series with the indicator LED and a LED drive output of the function control module and in the non-dimming state a low resistance of the dimming circuit is coupled in series with the indicator LED and the LED drive output of the function control module. The high resistance has a resistance higher than the low resistance.

9 Claims, 3 Drawing Sheets

(56) References Cited

U.S. PATENT DOCUMENTS

| | | | |
|---|---|---|---|
| 2006/0146553 A1* | 7/2006 | Zeng | B60Q 11/002 |
| | | | 362/488 |
| 2006/0170365 A1 | 8/2006 | Rodriguez et al. | |
| 2013/0069528 A1* | 3/2013 | Yasue | H05B 37/02 |
| | | | 315/77 |
| 2013/0249437 A1* | 9/2013 | Wang | H05B 33/0815 |
| | | | 315/307 |
| 2014/0042933 A1* | 2/2014 | Livschitz | H05B 33/0848 |
| | | | 315/307 |
| 2015/0098045 A1* | 4/2015 | Imanaka | H05B 33/0815 |
| | | | 349/69 |
| 2015/0152965 A1* | 6/2015 | Ha | F16H 63/42 |
| | | | 315/77 |
| 2015/0302738 A1* | 10/2015 | Geerlings | G08C 17/02 |
| | | | 340/5.25 |
| 2015/0366038 A1* | 12/2015 | Van Der Brug | H04B 3/54 |
| | | | 315/294 |

* cited by examiner

TWO STAGE INDICATOR DIMMING CIRCUIT CONTROLLED BY PWM BACKLIGHTING BACK FEED AND BACKLIGHT CONTROL

FIELD

The present invention relates to non-microprocessor control of indicator light emitting diodes in vehicle utilizing existing circuits in vehicles used for backlighting switch graphics and also to a non-microprocessor based circuit to backlight switch graphics at low ambient conditions.

BACKGROUND

Light emitting diodes (LEDs) are used in vehicles to indicate whether switchable functions are on or off and also to backlight switches that switch the function on and off. In many cases, a switch that is used to switch a function on and off is packaged with a LED that is on and thus illuminated when the function has been switched on and off and thus not illuminated when the function has been switched off. This LED is often referred to as an indicator jewel and will be referred to herein as an "indicator LED." Also in many cases, such a switch is also packaged with a backlight LED that is turned on, such as in low ambient light conditions such as nighttime, to backlight the switch so that a vehicle driver is better able to see it such as in low ambient light conditions. This LED will be referred to herein as a "backlight LED." In many cases, such a backlight LED is turned on when the vehicle's lights (are turned on and turned off when the vehicle's lights are turned off. In this regard, a vehicle's parking lights can be turned on without turning the vehicle's headlamps and taillights on and remain on when the vehicle's headlamps and taillights are turned on.

As is known, indicator LEDs are typically at a brighter level during high ambient light conditions, such as daylight, and often at a dimmer level during low ambient light conditions, such as nighttime. In contrast, backlight LEDs are typically off, or driven at a dimmer level, during high ambient light conditions and at a brighter level during low ambient light conditions.

FIG. 1 is a simplified schematic of a typical circuit used in vehicles to illuminate indicator LEDs and backlight LEDS. FIG. 1 shows an indicator switch 100 having a switch 102, an indicator LED 104 and a backlight LED 106. Indicator LED 104 is coupled to an output 108 of an electric control unit 110 of a vehicle, such as a body control module of the vehicle, at which a pulse width modulated output signal is provided. Output 108 will be referred to herein as indicator LED PWM output 108. Backlight LED 106 is coupled to an output 112 of electronic control unit 110 at which a pulse width modulated output signal is also provided. Output 112 will be referred to herein as backlight LED PWM output 112. In operation, ECU 110 sets the duty cycle of the pulse width modulated signals at indicator LED PWM output 108 and backlight LED PWM output 112 to drive the indicator LED 104 and backlight LED 106 to achieve the desired illumination. When backlighting is not on, for example when the vehicle lights are off, ECU 110 sets the duty cycle of the pulse width modulated output signal at indicator LED PWM output 108 at a high duty cycle so that indicator LED 100 outputs a high light level. ECU 110 also either doesn't output a pulse width modulated signal at backlight LED PWM output 112 so that backlight LED 106 is off or sets the duty cycle of the pulse width modulated output signal at backlight LED PWM output 112 at a low level so that backlight LED 106 outputs light at low level. When backlighting is on, for example when the vehicle lights are on, ECU 110 sets the duty cycle of the pulse width modulated signal at indicator LED PWM output 108 at a lower duty cycle to that LED 100 outputs light at a lower level than during high ambient light conditions. ECU 110 also sets the duty cycle of the pulse width modulated signal at backlight LED PWM output 112 at a duty cycle so that backlight LED 106 outputs light at a desired level that is higher than during high ambient light conditions. It should be understood, that the light intensity level of both indicator LEDs and backlight LEDs are typically user adjustable such as by the adjustment of a potentiometer or other device (not shown) coupled to ECU 110. ECU 110 responds to the user adjustment and sets the duty cycles of the PWM signals output at indicator LED PWM output 108 and backlight LED PWM output 112 accordingly.

In some cases, the indicator LED of an indicator switch for a vehicle function is not driven by a PWM output of an ECU although the backlight LED is. Rather, it is simply switched on or off by a function control module that controls that vehicle function. For example and with reference to FIG. 2, one type of function control module is electronic parking brake control module 208 that directly switches on and off the indicator LED 204 of an indicator switch 200 having a switch 202 used to switch the electronic parking brake (not shown) on and off. In this example, an anode 212 of indicator LED 204 is coupled to a source of DC voltage, such as 12 VDC, and a cathode 214 of indicator LED 204 is coupled to a LED drive output 210 of electronic parking brake control module 208. Electronic parking brake control module 208 couples the cathode of indicator LED 204 to common to turn indicator LED 204 on and decouples the cathode of indicator LED 204 from common to turn indicator LED 204 off. A backlight LED 206 of this indicator switch 200 is coupled to the backlight LED PWM output 112 of the ECU 110 and remains controlled by ECU 110 in the same manner as backlight LED 106 is controlled by ECU 110. In this type of indicator switch, when the indicator LED 204 is on, it is always on at the same light level and can't be dimmed. The indicator LED 204 is thus on at full brightness whether backlighting is on or off. As is known, however, it is desirable that indicator LEDs when they are on be brighter during when backlighting is off (such as during daytime when the lights of the vehicle are off) and dimmer when backlighting is on (such as during nighttime when the lights of the vehicle are on). It should be understood that the function control module can be for controlling functions other than an electronic parking brake and that references to electronic park brake module 208 should be understood to refer to any function control module that controls the indicator LED of an indicator switch in the described manner.

SUMMARY

In accordance with an aspect of the present disclosure, a dimming circuit for an indicator switch is provided. The indicator switch includes a manually actuated switch, an indicator LED that is turned on and off by a function control module to which the indicator switch is coupled wherein the indicator LED is on when a function actuated by the manually actuated switch of the indicator switch is active and off when the function actuated by the manually actuated switch of the indicator switch is off. The dimming circuit has a control input, a dimming state and a non-dimming state.

The dimming circuit is responsive to the presence of a backlight PWM signal at the control input of the dimming circuit to switch to the dimming state and responsive to the absence of the backlight PWM signal at the control input of the dimming circuit to switch to the non-dimming state. When the dimming circuit is in the dimming state a high resistance of the dimming circuit is coupled in series with the indicator LED and a LED drive output of the function control module and when the dimming circuit is in the non-dimming state a low resistance of the dimming circuit is coupled in series with the indicator LED and the LED drive output of the function control module. The high resistance has a resistance higher than the low resistance.

In an aspect, the dimming circuit includes an electrically actuated switch responsive to the backlight PWM signal at the control input of the dimming circuit so that when dimming circuit is in the dimming state switches so that the high resistance is in series with the indicator LED and the LED drive output of the function control module and responsive to the absence of the backlight PWM signal at the control input of the dimming circuit switches so that the low resistance is in series with the indicator LED and the drive output of electronic parking module.

In an aspect, the dimming circuit includes a first resistor coupled between the indicator LED and the LED drive output of the function control module and a second resistor coupled in series with the electrically actuated switch between the indicator LED and LED drive output of the function control module. The series coupled second resistor and electrically actuated switch are coupled in parallel with the first resistor. When the dimming circuit is in the dimming state the electrically actuated switch is non-conducting and the first resistor provides the high resistance and when the dimming circuit is in the non-dimming state, the electrically actuated switch is conducting and the second resistor is coupled in parallel with the first resistor with the parallel coupled first and second resistors providing the low resistance.

In an aspect, the electrically actuated switch includes first and second NPN transistors with the second resistor coupled between a collector of the second NPN transistor and the indicator LED. An emitter of the second NPN transistor is coupled to the LED drive output of the function control module. A base of the second NPN transistor is coupled through a resistor to a collector of the first NPN transistor. An emitter of the first NPN transistor is coupled to a common and a base of the first NPN transistor is coupled to a bias circuit. The bias circuit in response to the presence of the backlight PWM signal at the control input of the dimming circuit biasing the first NPN transistor on which biases the second NPN transistor off and the bias circuit in response to the backlight PWM signal not being present at the control input biases the first NPN transistor off which biases the second NPN transistor on.

In an aspect, the bias circuit includes a resistance-capacitance circuit having resistance and capacitance values that the resistance-capacitance circuit charges due to the presence of the PWM signal at the control input of the dimming circuit to a level that saturates the first NPN transistor to bias the first NPN transistor on.

In an aspect, the indicator switch has a backlight LED that is switched between an active state and an inactive state by the function control module. The backlight LED when in the active state is driven by the backlight PWM signal and is off in the inactive state. The backlight LED is in the inactive state when the function actuated by the manually actuated switch of the indicator switch is active and in the active state when the function actuated by the manually actuated switch of the indicator switch is inactive, the dimming circuit further including a second electrically actuated switch that switches the backlight LED between and between its active and inactive states, the second electrically actuated switch having a control input coupled to the LED drive output of the function control module.

In an aspect, the second electrically actuated switch switches to a non-conducting state turning the backlight LED off in response to the LED drive output of the function control module driving the indicator LED to be on and switches to a conducting state when the LED drive output of the function control module is driving the indicator LED to be off with the backlight LED then driven by the PWM backlight signal when the second electrically actuated switch is conducting.

BRIEF DESCRIPTION OF THE DRAWINGS

The present invention will become more fully understood from the detailed description and the accompanying drawings, wherein.

DETAILED DESCRIPTION

Figure 1:
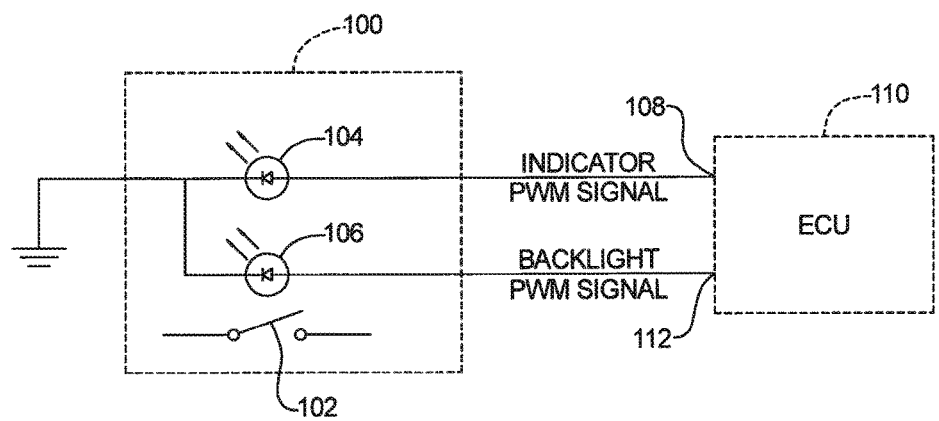
FIG. 1 is a simple schematic showing a prior art indicator switch having an indicator LED and a backlight LED each of which is driven by a PWM signal outputted by an ECU.
Figure 2:
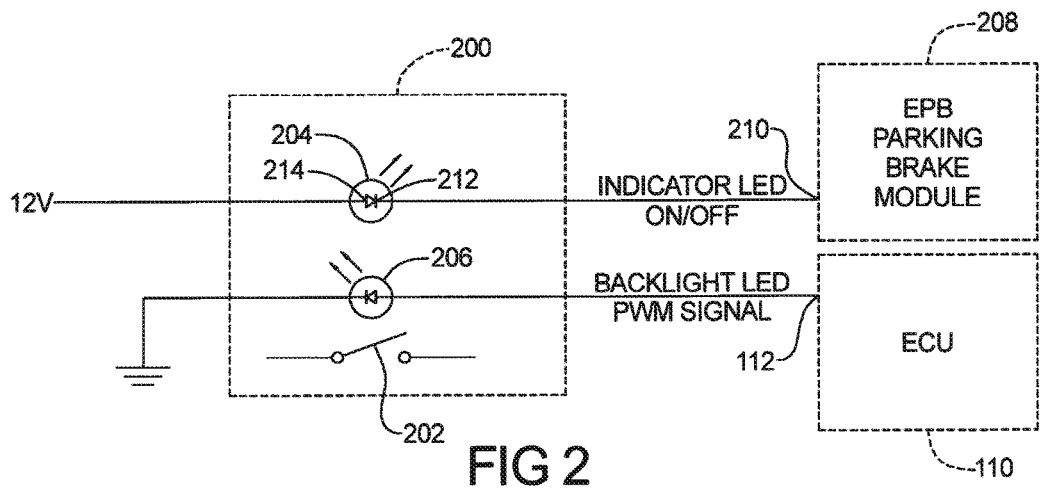
FIG. 2 is simple schematic showing a prior art indicator switch with an indicator LED of the indicator switch switched on and off by an electronic parking brake control module and a backlight LED driven by a backlight PWM signal outputted by an ECU.

The following description of the preferred embodiment(s) is merely exemplary in nature and is in no way intended to limit the invention, its application, or uses. Corresponding reference numerals indicate corresponding parts throughout the several views of the drawings.

Figure 3:
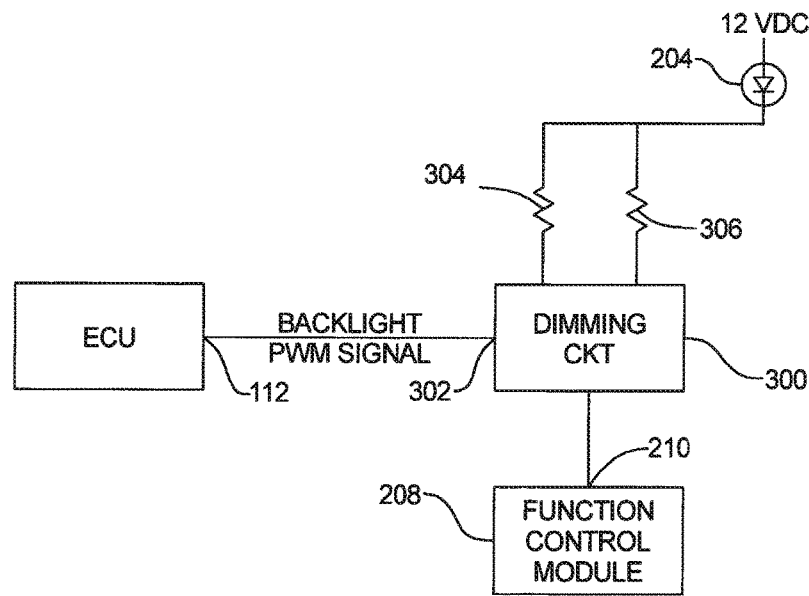
FIG. 3 is a block diagram showing a dimming circuit in accordance with an aspect of the present disclosure connected to the indicator LED of the indicator switch and driven by the backlight PWM signal outputted by the ECU and switched by an electronic parking brake control module.

In accordance with an aspect of the present disclosure and with reference to FIG. 3, a dimming circuit for an indicator switch has a dimming state and a non-dimming state. When backlighting is on dimming circuit 300 responds to the absence of a backlight PWM signal at a control input 302 of dimming circuit 300 to switch to the non-dimming state. In the non-dimming state, a low resistance 306 of the dimming circuit is coupled in series with indicator LED 204 of indicator switch 200 and a LED drive output 210 of a function control module such as electronic parking brake control module 208. It should be understood that the function control module can be a function control module that controls a function other than an electronic parking brake. When backlighting is on, the backlight PWM signal is present at control input 302. Dimming circuit 300 responds to the presence of the backlight PWM signal at its control input 302 to switch to the dimming state. In the dimming state, a high resistance 304 of the dimming circuit is coupled in series with indicator LED 204 of indicator switch 200 and LED drive output 210 of electronic parking brake control module 208. It should be understood that the terms "high"

and "low" with respect to high resistance 304 and low resistance 306 are relative terms and simply mean that high resistance 304 has a higher resistance than low resistance 306. The backlight PWM signal is the backlight PWM signal output at backlight LED PWM output 112 of ECU 110. Thus, the high resistance 304 is coupled in series with indicator LED 204 and LED drive output 210 of electronic parking brake control module 208 when backlighting is on (such as due to the lights of the vehicle being on) which typically occurs during low ambient light conditions, and the backlight PWM signal is present at control input 302. The low resistance 306 is coupled in series with indicator LED 204 and LED drive output 210 of electronic parking brake control module 208 when backlighting is off (such as due to lights of the vehicle being off) which typically occurs during high ambient light conditions. Thus, indicator LED 204 when it is turned on by electronic parking brake control module 208 is brighter when backlighting is off and dimmer when backlighting is on.

In the illustrative embodiment shown in FIG. 3, dimming circuit 300 includes an electrically actuated switch responsive to the backlight PWM signal at the control input 302 of dimming circuit 300 that when dimming circuit 300 is in the dimming state, switches so that the high resistance 304 is in series with the indicator LED 204 and LED drive output 210 of electronic parking brake control module 208 and responsive to the absence of the backlight PWM signal at the control input 302 of dimming circuit 300 switches so that the low resistance 306 is in series with the indicator LED 204 and LED drive output 210 of electronic parking control module 208.

Figure 4:
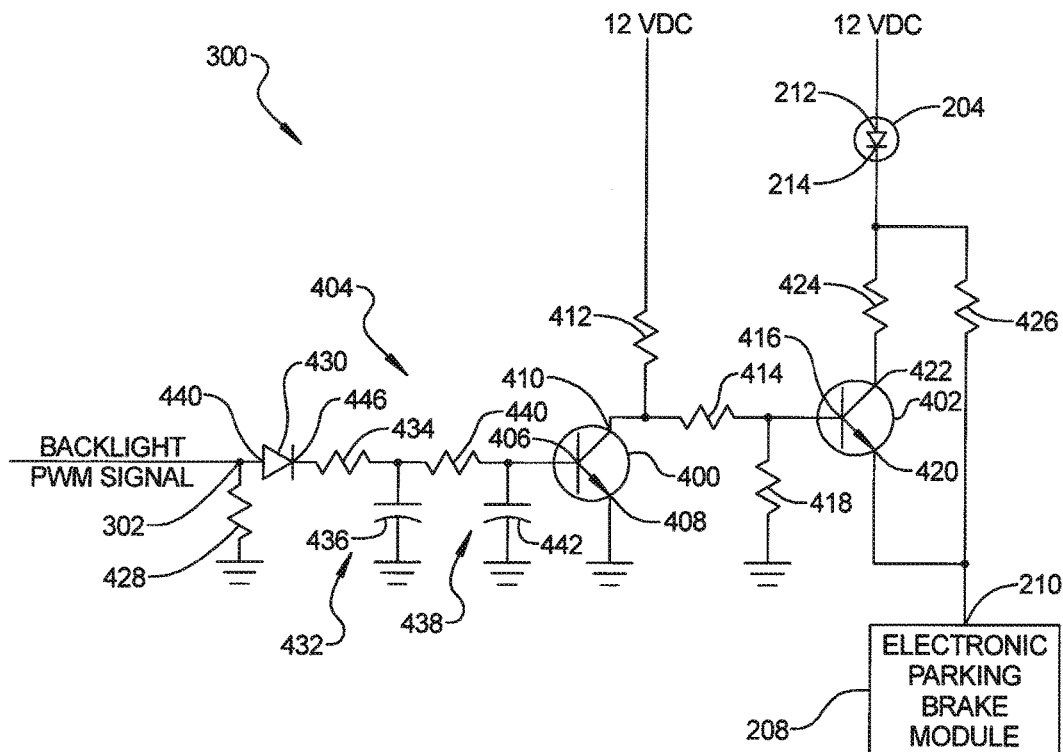
FIG. 4 is a schematic of the dimming circuit of FIG. 3.

FIG. 4 is a schematic showing an embodiment of dimming circuit 300 in more detail. Dimming circuit 300 includes NPN transistor 400 and NPN transistor 402 which together form an electrically actuated switch 403. A bias circuit 404 is coupled between a base 406 of NPN transistor 400 and control input 302 of dimming circuit 300. Base 406 of NPN transistor 400 provides a control input 405 of electrically actuated switch 403 and is coupled via bias circuit 404 to control input 302 of dimming circuit 300. An emitter 408 of NPN transistor 400 is coupled to common and a collector 410 of NPN transistor 400 is coupled through a resistor 412 to a DC voltage source, such as 12 VDC and is also coupled through a resistor 414 to a base 416 of NPN transistor 402. A resistor 418 is coupled between base 416 of NPN transistor 402 and common. An emitter 420 of NPN transistor 402 is coupled to LED drive output 210 of electronic parking brake control module 208. A collector 422 of NPN transistor 402 is coupled through a resistor 424 to the cathode 214 of indicator LED 204 of indicator switch 200. Cathode 214 of indicator LED 204 is also coupled through a resistor 426 to LED drive output 210 of electronic parking brake control module 208.

Bias circuit 404 includes a resistor 428, a diode 430, a resistance-capacitance circuit that includes an RC circuit 432 having a resistor 434 and a capacitor 436 and an RC circuit 438 having a resistor 440 and a capacitor 442. Control input 302 of dimming circuit 300 is at a junction of resistor 428 and an anode 444 of a diode 430. RC circuits 432 and 438 are coupled in series with each other between a cathode 446 of diode 430 and base 406 of NPN transistor 400 with resistors 434 and 440 of RC circuits 432, 438 connected in series between cathode 446 of diode 430 and base 406 of NPN transistor 400. Capacitor 436 of RC circuit 432 is coupled between a junction of resistors 434, 440 and common and capacitor 442 of RC circuit 438 is coupled between base 406 of NPN transistor 400 and common.

Resistor 428 is coupled between anode 440 of diode 430 and common. In operation, when the electronic parking brake is off, LED drive output 210 of electronic parking brake control module 208 is high (such as by be being allowed to float high). Current thus does not flow through indicator LED 204 and indicator LED 204 is off.

When the electronic parking brake is on, LED drive output 210 of electronic parking brake control module is low (such as being coupled to common as discussed above). Current then flows through indicator LED 204 and indicator LED 204 is on.

When indicator LED 204 is on, its brightness is determined by whether there is a backlight PWM signal present at control input 302 of dimming circuit 300. If there is a backlight PWM signal present at control input 302, bias circuit 404 is charged by the backlight PWM signal to a voltage level that saturates NPN transistor 400 biasing NPN transistor 400 on which in turn biases NPN transistor 402 off. Current then flows from indicator LED 204 to electronic parking brake control module 208 only through resistor 426 with resistor 426 providing the high resistance 304. If there is not a backlight PWM signal at control input 302, bias circuit 404 is not charged to a level that saturates NPN transistor 400 and NPN transistor 400 is biased off which in turn biases NPN transistor 402 on. Resistors 424 and 426 are thus connected in parallel and current flows from indicator LED 204 to electronic parking brake control module 208 through the parallel resistance of resistor 424 and resistor 426. This parallel resistance of resistor 424 and resistor 426 is lower than the resistance of resistor 426 and this parallel resistance of resistor 424, 426 provides the low resistance 306. Due to the lower resistance provided by parallel connected resistors 424, 426, there is a higher current flow through indicator LED 204 and the parallel connected resistors 424, 426 than when resistors 424, 426 are not connected in parallel and current flows only through resistor 426. Thus, when there is no backlight PWM signal present at control input 302 of dimming circuit 300, indicator LED 204 will be at a brighter level due to the higher current flow than when there is a backlight PWM signal present at control input 302. It should be understood that the values of resistors 424, 426 are selected to provide desired brightness's of indicator LED 204 when there is no backlight PWM signal present at control input 302 (such as during high ambient light conditions when the lights of the vehicle are off) and when there is a backlight PWM signal present at control input 302 (such as during low ambient light conditions when the lights of the vehicle are on).

Figure 5:
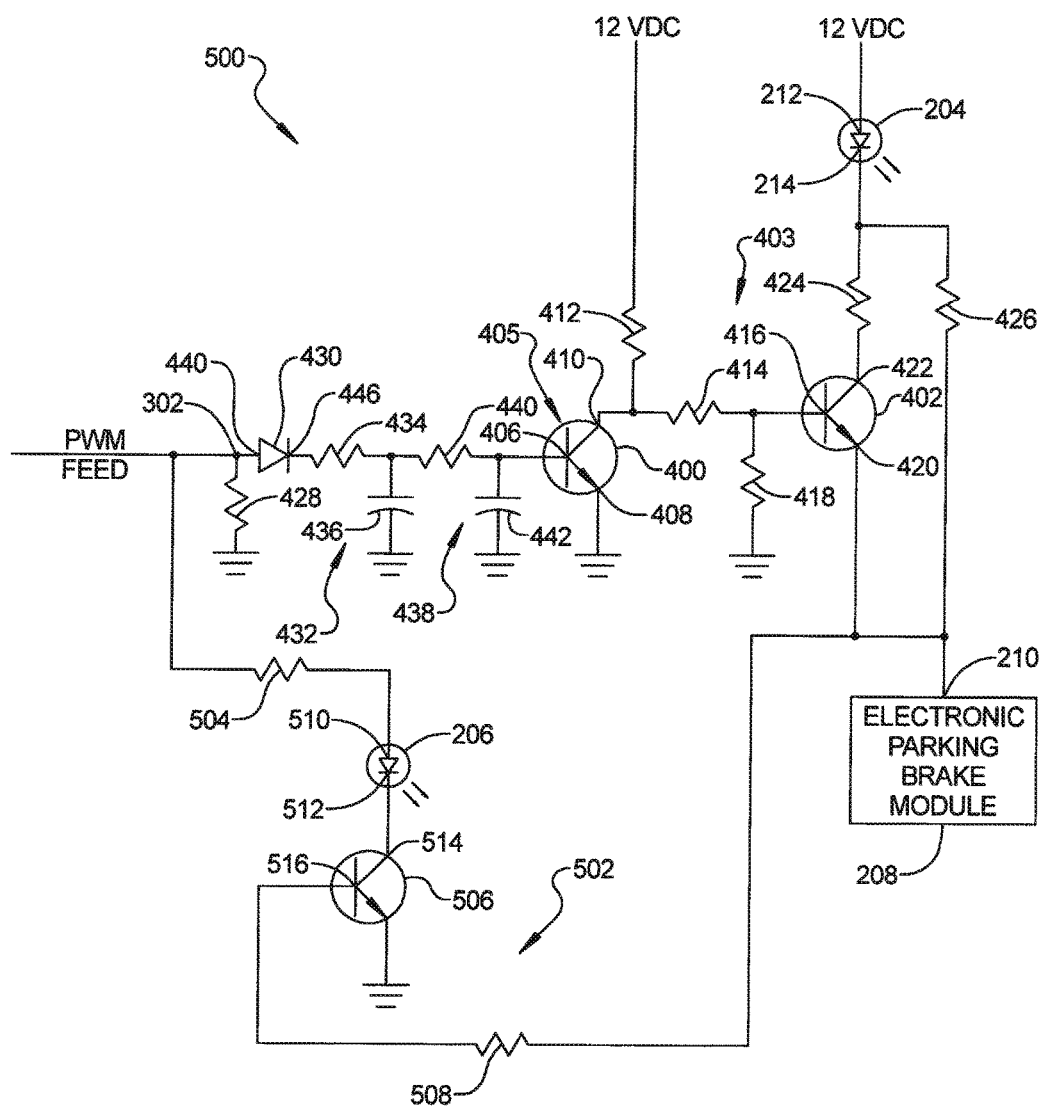
FIG. 5 is a schematic of a variation of the dimming circuit of FIG. 3.

FIG. 5 is a schematic of a dimming circuit 500 that is a variation of dimming circuit 300. Dimming circuit 500 ads on/off switching of backlight LED 206. In this variation, backlight LED 206 is one color, such as green, and indicator LED 204 is a different color, such as amber. When backlighting is on and the function controlled by the indicator switch 200 is inactive (such as being off), indicator LED 204 is turned off and the backlight LED 206 is turned on. In addition to LED 204 being off, the color (such as green) of backlight LED 206 is used to indicate that the function is inactive making the inactive status indication more visible to the vehicle driver during low ambient light conditions. When backlighting is on and the function controlled by indicator switch 200 is active, backlight LED is turned off and indicator LED 204 turned on. In addition to indicator LED 204 being illuminated its color (such as amber) indicates that the function is active. When backlighting is off, backlight LED 206 is off and indicator LED 204 turned on or off depending on whether the function is active.

In the embodiment of dimming circuit 500 shown in FIG. 5, backlight LED control circuit 502 is added to dimming circuit 300 to provide backlight control circuit 503. Backlight LED control circuit 502 includes resistor 504, NPN transistor 506 and resistor 508. Resistor 504 is coupled between control input 302 of dimming circuit 500 and an anode 510 of backlight LED 206. A cathode 512 of backlight LED 206 is coupled to a collector 514 of NPN transistor 506 and an emitter of NPN transistor 506 is coupled to common. A base 516 of NPN transistor 506 is coupled through resistor 508 to LED drive output 210 of electronic parking brake control module 208. NPN transistor 506 is an electrically actuated switch with its base 506 being the control input of the electrically actuated switch.

When the electronic parking brake function is active, indicator LED 204 is turned on by electronic parking brake control module 208 and its brightness determined by whether backlighting is on, as described above with respect to dimming circuit 300. That is, when backlighting is off and the PWM backlight signal is not present at control input 302, indicator LED 204 is illuminated at a brighter intensity than when backlighting is on and the PWM backlight signal is present at control input 302. When electronic parking brake control module 208 has turned indicator LED 204 on, LED drive output 210 of electronic parking brake control module 208 is low as discussed above with respect to dimming circuit 300. This pulls base 516 of NPN transistor 506 low, biasing NPN transistor 506 off, which turns backlight LED 206 off as it blocks current from flowing through backlight LED 206. When electronic parking brake control module 208 turns indicator LED 204 off, LED drive output 210 of electronic parking brake control module will be high. This pulls the base 516 of NPN transistor 506 high turning NPN transistor 506 on. If backlighting is on, the PWM backlight signal is present at control input 302 of dimming circuit 500 and backlight LED 206 is then driven by the PWM backlight signal. If backlighting is off, the PWM backlight signal is not present at control input 302 and backlight LED 206 will be off.

It should be understood that in a variation, the circuit of FIG. 5 is modified so that it has only backlight control circuit 502. In this variation, backlight control circuit 502 includes resistor 504, NPN transistor 506 and resistor 508 but not the components of dimming circuit 300 shown in FIG. 5.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dimming circuit for an indicator switch, the indicator switch including a manually actuated switch, an indicator LED that is not driven by an indicator PWM signal and is turned on and off by a function control module to which the indicator switch is coupled wherein the indicator LED is on when a function actuated by the manually actuated switch of the indicator switch is active and off when the function actuated by the manually actuated switch of the indicator switch is off, the dimming circuit comprising:
   a control input; and
   the dimming circuit responsive to the presence of a backlight PWM signal at the control input of the dimming circuit to switch to a dimming state and responsive to the absence of the backlight PWM signal at the control input of the dimming circuit to switch to a non-dimming state, when the dimming circuit is in the dimming state a high resistance of the dimming circuit is statically connected in series with the indicator LED and a LED drive output of the function control module and when the dimming circuit is in the non-dimming state a low resistance of the dimming circuit is statically connected in series with the indicator LED and the LED drive output of the function control module, the high resistance having a resistance higher than the low resistance, wherein a light intensity of the indicator LED when the dimming circuit is in the non-dimming state is higher than when the dimming circuit is in the dimming state.

2. The dimming circuit of claim 1 including an electrically actuated switch responsive to the backlight PWM signal at the control input of the dimming circuit so that when dimming circuit is in the dimming state switches so that the high resistance is in series with the indicator LED and the LED drive output of the function control module and responsive to the absence of the backlight PWM signal at the control input of the dimming circuit switches so that the low resistance is in series with the indicator LED and the LED drive output of the function control module.

3. The dimming circuit of claim 2, including a first resistor coupled between the indicator LED and the LED drive output of the function control module and a second resistor coupled in series with the electrically actuated switch between the indicator LED and LED drive output of the function control module, the series coupled second resistor and electrically actuated switch coupled in parallel with the first resistor, wherein when the dimming circuit is in the dimming state the electrically actuated switch is non-conducting and the first resistor provides the high resistance and when the dimming circuit is in the non-dimming state, the electrically actuated switch is conducting and the second resistor is coupled in parallel with the first resistor with the parallel coupled first and second resistors providing the low resistance.

4. The dimming circuit of claim 3 wherein the electrically actuated switch includes first and second NPN transistors with the second resistor coupled between a collector of the second NPN transistor and the indicator LED, an emitter of the second NPN transistor coupled to the LED drive output of the function control module, a base of the second NPN transistor coupled through a resistor to a collector of the first NPN transistor, an emitter of the first NPN transistor coupled to a common and a base of the first NPN transistor coupled to a bias circuit, the bias circuit in response to the presence of the backlight PWM signal at the control input of the dimming circuit biasing the first NPN transistor on which biases the second NPN transistor off and the bias circuit in response to the backlight PWM signal not being present at the control input biasing the first NPN transistor off which biases the second NPN transistor on.

5. The dimming circuit of claim 4 wherein the bias circuit includes a resistance-capacitance circuit having resistance and capacitance values so that the resistance-capacitance circuit charges due to the presence of the backlight PWM signal at the control input of the dimming circuit to a level that saturates the first NPN transistor to bias the first NPN transistor on.

6. The dimming circuit of claim 1 wherein the indicator switch has a backlight LED that is switched between an active state and an inactive state by the function control module, the backlight LED when in the active state is driven by the backlight PWM signal and is off in the inactive state, the backlight LED in the inactive state when the function actuated by the manually actuated switch of the indicator switch is active and in the active state when the function actuated by the manually actuated switch of the indicator switch is inactive, the dimming circuit further including a second electrically actuated switch that switches the backlight LED between its active and inactive states, the second electrically actuated switch having a control input coupled to the LED drive output of the function control module.

7. The dimming circuit of claim 6 wherein the second electrically actuated switch switches to a non-conducting state turning the backlight LED off in response to the LED drive output of the function control module driving the indicator LED to be on and switches to a conducting state when the LED drive output of the function control module is driving the indicator LED to be off with the backlight LED then driven by the backlight PWM signal when the second electrically actuated switch is conducting.

8. A backlight control circuit for an indicator switch, the indicator switch including a manually actuated switch, an indicator LED that is not driven by an indicator PWM signal and is turned on and off by a function control module to which the indicator switch is coupled wherein the indicator LED is on when a function actuated by the manually actuated switch of the indicator switch is active and off when the function actuated by the manually actuated switch of the indicator switch is off, the indicator switch also including a backlight LED that is switched between an active state and an inactive state by the function control module, the backlight LED when in the active state is driven by a backlight PWM signal present at a control input of the backlight control circuit and is off in the inactive state, the backlight LED in the inactive state when the function actuated by the manually actuated switch of the indicator switch is active and in the active state when the function actuated by the manually actuated switch of the indicator switch is off, the backlight control circuit comprising:

an electrically actuated switch that switches the backlight LED between its active and inactive states, the electrically actuated switch having a control input coupled to a LED drive output of the function control module to which the indicator LED is also coupled.

9. The backlight control circuit of claim 8 wherein the electrically actuated switch switches to a non-conducting state turning the backlight LED off in response to the LED drive output of the function control module driving the indicator LED to be on and switches to a conducting state when the LED drive output of the function control module is driving the indicator LED to be off with the backlight LED then driven by the backlight PWM signal when the electrically actuated switch is conducting.

* * * * *